US006941522B2

(12) United States Patent
Brown

(10) Patent No.: US 6,941,522 B2
(45) Date of Patent: Sep. 6, 2005

(54) METHODS AND APPARATUS FOR IMPLEMENTING A PROGRESS REPORTING INTERFACE

(75) Inventor: Jordan Brown, Granada Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 755 days.

(21) Appl. No.: 09/898,881

(22) Filed: Jul. 2, 2001

(65) Prior Publication Data

US 2003/0005022 A1 Jan. 2, 2003

(51) Int. Cl.[7] .................................................. G06F 3/00

(52) U.S. Cl. ....................... 715/772; 715/764; 715/966; 719/328; 719/310

(58) Field of Search ................................ 715/772, 764, 715/771, 966, 970; 714/46; 719/310, 313, 315, 318, 328; 345/440.2, 440

(56) References Cited

U.S. PATENT DOCUMENTS 5,301,348 A * 4/1994 Jaaskelainen ................ 714/46
5,953,010 A * 9/1999 Kampe et al. .............. 345/772
6,100,887 A * 8/2000 Bormann et al. ........... 345/764
6,330,008 B1 * 12/2001 Razdow et al. ............. 345/772
6,639,687 B1 * 10/2003 Neilsen ..................... 358/1.14
2002/0180795 A1 * 12/2002 Wright ....................... 345/772

* cited by examiner

*Primary Examiner*—Raymond J. Bayerl
(74) *Attorney, Agent, or Firm*—Beyer Weaver & Thomas LLP

(57) ABSTRACT

Methods and apparatus for providing a progress associated with an executing process are disclosed. A progress report is generated in a progress reporting language, the progress reporting language indicating a progress of one or more steps in the executing process. The progress report is then provided to a user interface mechanism capable of interpreting the progress reporting language, where the user interface mechanism is adapted for generating a user interface indicating the progress of the one or more steps in the executing process. The user interface mechanism receives the progress report, ascertains the progress of the steps in the executing process from the progress report, and generates a user interface indicating the progress of the steps in the executing process.

24 Claims, 6 Drawing Sheets

METHODS AND APPARATUS FOR IMPLEMENTING A PROGRESS REPORTING INTERFACE

BACKGROUND OF THE INVENTION

1. Field of the Invention

The present invention relates generally to computer software. More particularly, the present invention relates to methods and apparatus for implementing a progress reporting interface during execution of software applications.

2. Description of Related Art

In certain computer operating systems, a job is defined as the unit of work that a computer operator (or a program called a job scheduler) provides to the operating system. For example, a job could refer to the execution of an application program such as a weekly payroll program. A job is usually said to be run in batch (rather than interactive) mode. The operator or job scheduler gives the operating system a "batch" of jobs to do (e.g., payroll, cost analysis, employee file updating) and these are performed in the background when time-sensitive interactive work is not being done. Each job is broken down into "job steps," a unit of work that a computer operator (or job scheduler) gives to the operating system. An example of a job step might be to make sure that a particular data set (e.g., computation) or database needed in the job is made accessible.

In a modem user interface, it is desirable to report the progress of long-running tasks such as batch jobs. However, when a job is run, the progress of the job is rarely reported. As one example, a job is often run from a specific type of user interface such as a command line interface (e.g., shell prompt). After the command indicating the job to run is provided at the shell prompt, the next "progress" report that the user often receives is the output from that particular job.

Another problem with the reporting of progress with respect to an executing job is the fact that the reporting is often integrated with the job being executed. While the integrated mode of progress reporting may be desirable in some circumstances, such integrated progress reporting is often undesirable. More particularly, the "front end" process responsible for reporting the progress of the job is often de-coupled from the "back end" process that is executing the job. As one example, when a user executes a job via a web browser interface, the server performing the job is typically located at another location. Since the front end typically does not have sufficient information associated with the back end processing, it is common for the front end to merely report the completion of execution of the job. Even when the progress is reported during the execution of a job, this "report" is often merely a simple display such as a flashing or spinning indicating that the job is being executed, with no indication of the progress made or the estimated time to completion.

In view of the above, it would be desirable if the progress of execution of a particular job could be reported prior to completion of execution of the job. Moreover, it would be beneficial if such a progress report could be provided independent from the front end responsible for presenting the progress.

SUMMARY

Methods and apparatus for reporting a progress associated with an executing process are disclosed. This is accomplished, in part, through the use of a progress reporting language. In this manner, an executing process may report a progress of its execution to a user interface mechanism.

In accordance with one aspect of the invention, a back-end process generates a progress report during its execution. The progress report is generated in a progress reporting language that indicates a progress of one or more steps in the executing process. The progress report is then provided to a user interface mechanism capable of interpreting the progress reporting language, where the user interface mechanism is adapted for generating a user interface indicating the progress of the steps in the executing process.

In accordance with yet another aspect of the invention, a front-end user interface mechanism generates a user interface from the progress report. More particularly, the user interface mechanism receives the progress report, ascertains the progress of the steps in the executing process from the progress report, and generates a user interface indicating the progress of the steps in the executing process. For instance, the user interface may be a textual display, visual display, or combined textual-visual display.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention enables a progress reporting interface to be implemented such that the progress of a running task (i.e., job or process) is reported during its execution. This is accomplished, in part, through the generation of a progress report in a generic progress reporting language. The progress report indicates a progress of an executing process (e.g., job), which may be indicated in a variety of ways. This progress report may then be provided to a user interface mechanism for generation of a user interface from the progress report. In this manner, a user interface may present the progress of an executing process that is de-coupled from the user interface.

Figure 1:
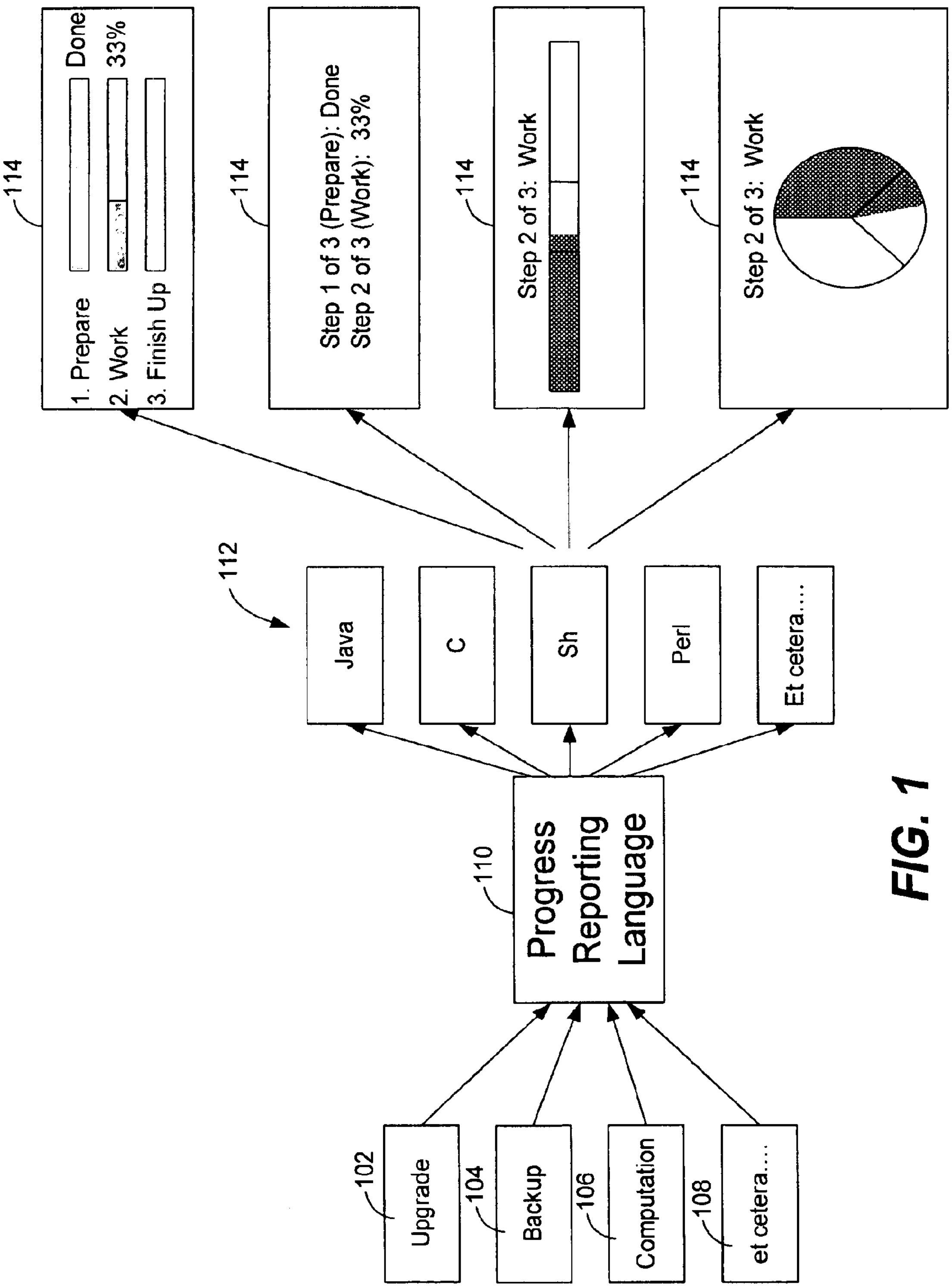
FIG. 1 is an exemplary diagram illustrating the generation of a progress report in a progress reporting language by an executing process for use by a user interface mechanism adapted for generating a user interface in accordance with one embodiment of the invention.

FIG. 1 is an exemplary diagram illustrating the generation of a progress report in a progress reporting language by an executing process for use by a user interface mechanism adapted for generating a user interface in accordance with one embodiment of the invention. More particularly, as shown in FIG. 1, one or more processes (e.g., jobs) may be executing separately or in parallel. For instance, exemplary jobs include the upgrade 102 of a process or system module, the backup 104 of data, a computation 106, or other process 108.

As each job executes, it generates a progress report in a progress reporting language 110 that indicates a progress of the executing process or job, as well as the progress of steps in the executing process. For instance, as shown at 112, generation and interpretation of the progress reporting language may be implemented in any suitable language, including, but not limited to, Java, C, Shell, or Perl. When the progress report is received by a user interface mechanism capable of interpreting the progress reporting language, the user interface mechanism generates a suitable user interface 114 that presents the progress in an effective manner. For instance, as shown, the user interface may be implemented in textual format, or other visual format, including a pie chart, bar graph, or combination of textual and visual formats.

Below is an example of a progress report generated in a progress reporting language:

```
define format Format the Hard Disk
define install Install the Software
define finish Finish up
begin format
progress 0 1000
progress 247 1000
progress 643 1000
end format
begin install
progress 1 5
progress 2 5
progress 3 5
progress 4 5
progress 5 5
end install begin finish
end finish
```

define <step identifier> <step description>

This line informs the user interface mechanism that there will be a step in the process tagged <step identifier>, with a <step description> that is adapted for display by the user interface mechanism. For instance, the <step description> may be provided in a human-readable (e.g., textual) format. Define lines indicate steps to be performed in the future; they do not indicate that the specified step is actually starting. Define lines are preferably (but need not be) output at the start of the process, to enable the user interface mechanism to provide advance display of the steps to be performed. The order of the define lines preferably, but need not, represents the order in which the steps will be performed.

begin <step identifier>

A begin indicator indicates to the user interface mechanism that execution of the specified step in the process (identified by the step identifier) is beginning. Such a progress reporting language may be used to allow parallel processing of multiple steps or jobs.

end <step identifier>

A completion indicator is used to indicate that execution of the step identified by the step identifier has completed.

progress <step identifier> <progress indicator>

A progress indicator is used to indicate to the user interface mechanism the progress of the specified step. For instance, the progress indicator may indicate a percentage of completion of the step of the executing process through the indication of one or more values. As one example, "progress copy 57 4352" may indicate that a milestone, 57, of a total number of substeps of the "copy" step, 4352, have been completed. In other words, this indicates the percentage of the step that has been completed. Ideally, such progress steps will be generated at least once every 10 seconds and no more frequently than 10 times per second. Thus, in this example, later provided values of the milestone would be greater than (or equal to) earlier provided values of the milestone. Similarly, the final progress report for a particular step should have a <milestone> equal to the <total>. As shown, the step identifier is preferably used to indicate the step being executed.

The above example is merely illustrative of program lines (e.g., data lines) that may be used to implement a progress reporting language. In addition, such a progress reporting language may be generated in a variety of programming languages. For instance, as described above, the progress reporting language may be implemented in Java, C, Shell, or Perl.

Figure 2:
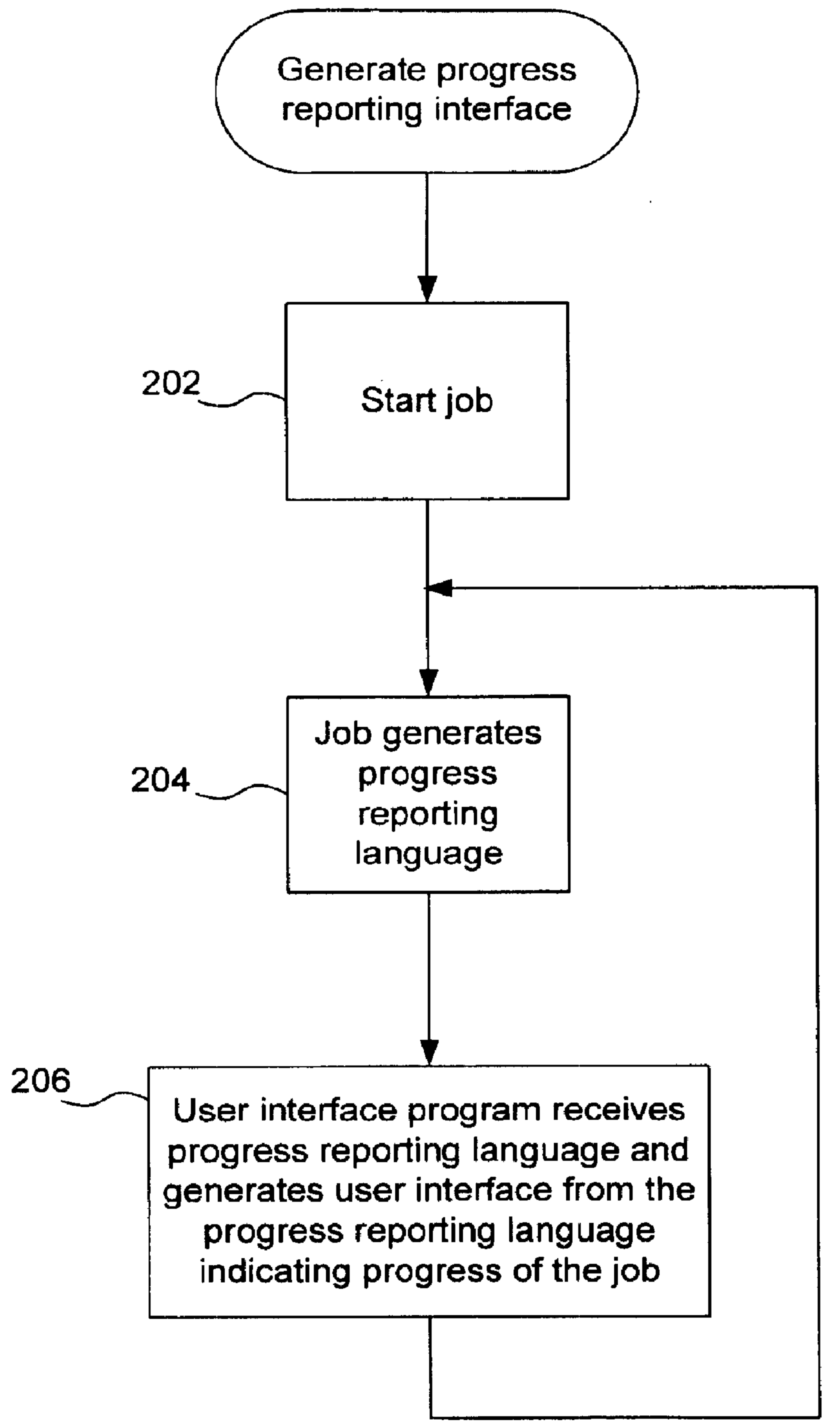
FIG. 2 is a method of generating a progress reporting interface from progress reporting language in accordance with one embodiment of the invention.

FIG. 2 is a method of generating a progress reporting interface from progress reporting language in accordance with one embodiment of the invention. As shown in FIG. 2, a job or process is started at block 202. While the process is executing, progress reporting language such as that described above is generated at block 204. A user interface mechanism or program receives the progress reporting language at block 206 and generates a user interface from the progress reporting language indicating the progress of the process. More particularly, as described above, the progress of one or more steps in the process may be indicated.

Figure 3:
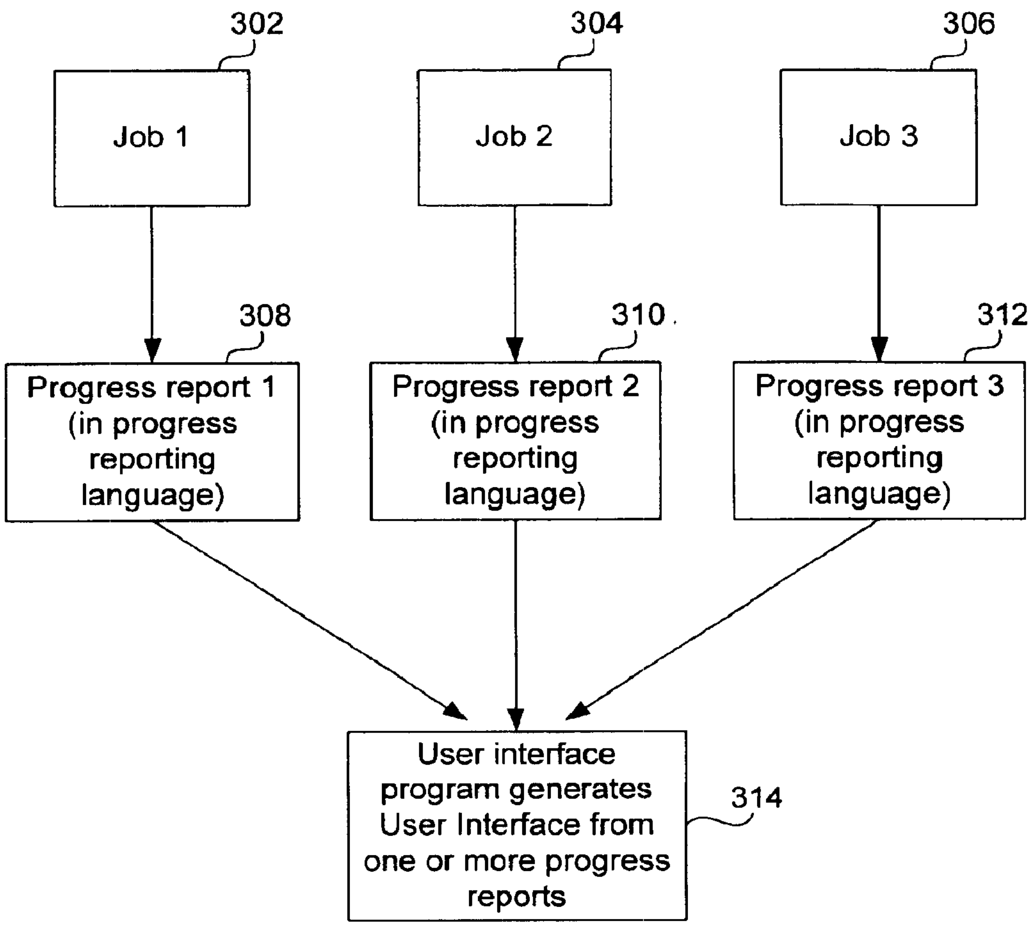
FIG. 3 is an exemplary diagram illustrating the generation of progress reports by multiple executing processes and the generation of a user interface from the progress reports.

As described above, the present invention may be implemented in a parallel-processing context. For instance, multiple processes or multiple steps in the same or different processes may be simultaneously executed. FIG. 3 is an exemplary diagram illustrating the generation of progress reports by multiple executing processes and the generation of a user interface from the progress reports. As shown, multiple jobs, Job 1 302, Job 2 304 and Job 3 306 execute and generate corresponding progress reports, Progress report 1 308, Progress report 2 310, and Progress report 3 312. A user interface mechanism 314 then receives these progress reports and generates a user interface with information from the progress reports. More particularly, the user interface preferably indicates a progress of those steps being executed.

Figure 4:
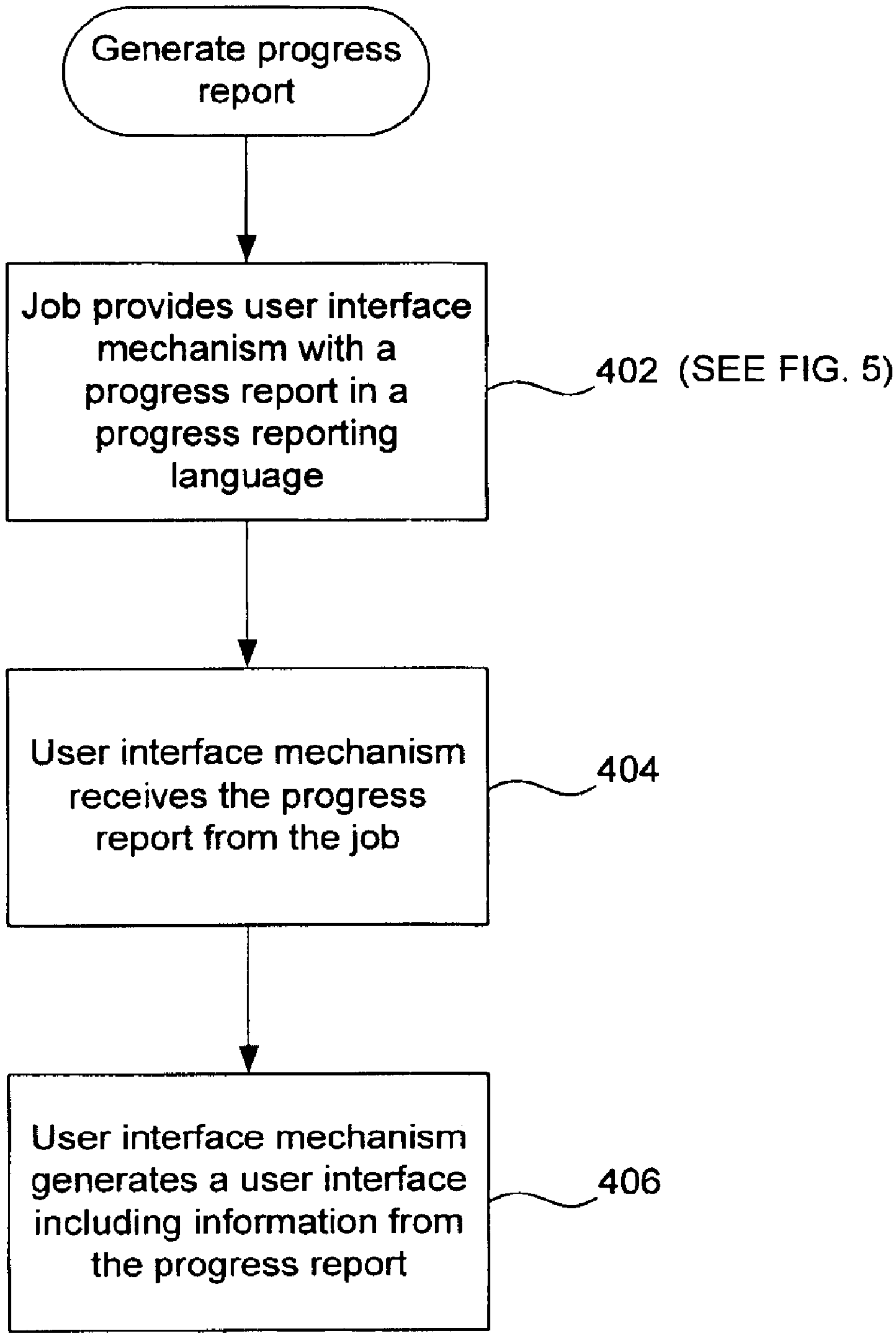
FIG. 4 is a process flow diagram illustrating a method of generating a progress report in accordance with one embodiment of the invention.

In accordance with several embodiments of the invention, a progress reporting interface may be generated as described above with reference to FIG. 2. One method of generating a progress reporting interface is through the generation of a progress report such as that illustrated above. FIG. 4 is a process flow diagram illustrating a method of generating a progress report in accordance with one embodiment of the invention. As described above, an executing process provides a user interface mechanism with a progress report in a progress reporting language at block 402. The generation of a progress report in a progress reporting language by a process or job will be described in further detail below with reference to FIG. 5. The user interface mechanism receives the progress report from the job at block 404 and generates a user interface including information from the progress report at block 406. More particularly, the information preferably indicates the status or progress of step(s) that have been executed and/or are currently being executed.

Figure 5:
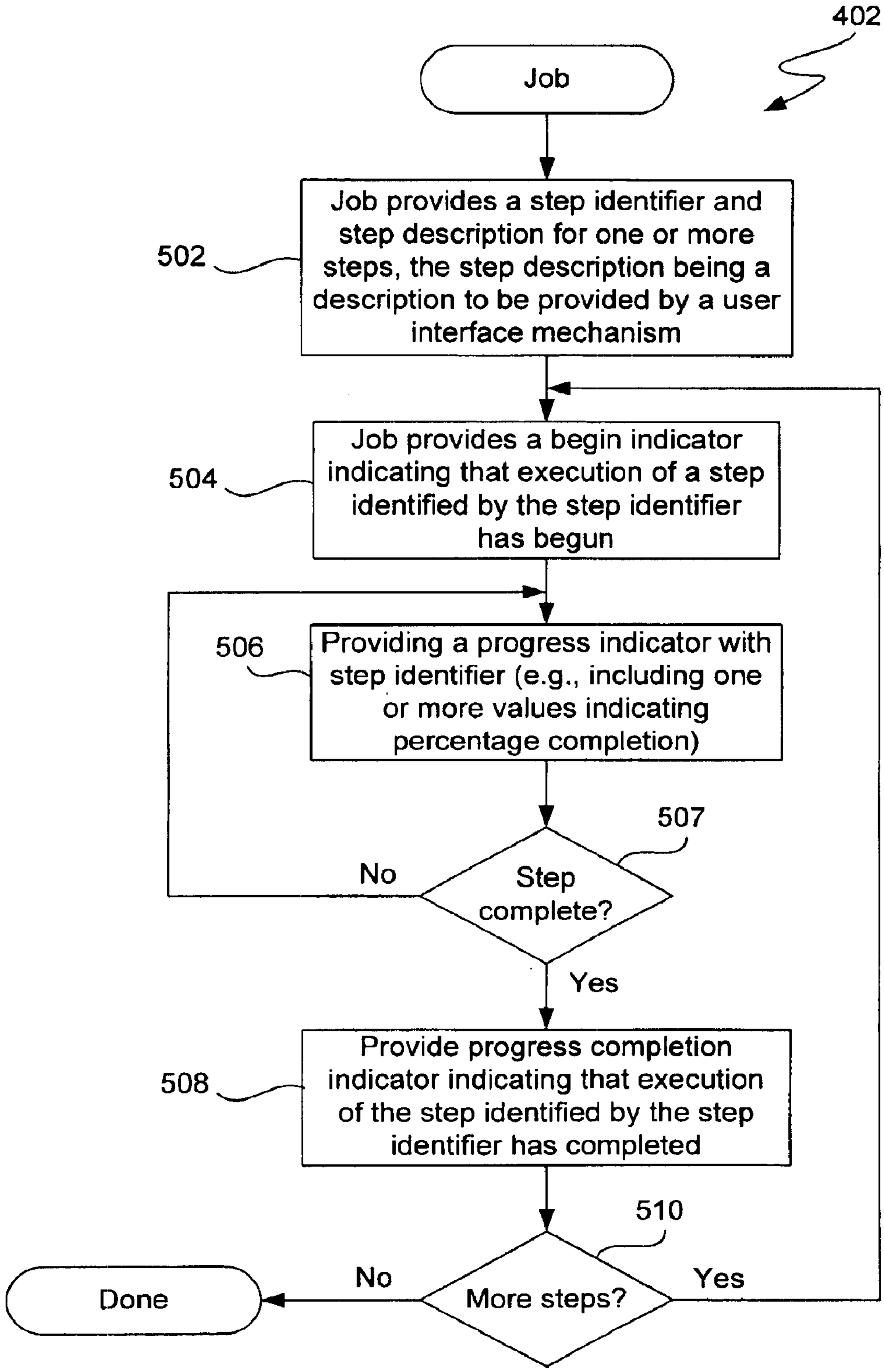
FIG. 5 is a process flow diagram illustrating a method of providing a progress report in a progress reporting language as shown at block 402 of FIG. 4 in accordance with one embodiment of the invention.

FIG. 5 is a process flow diagram illustrating a method of providing a progress report in a progress reporting language as shown at block 402 of FIG. 4. For each step in a process, a progress report is generated to indicate the progress of the executing step. As shown at block 502, the job provides a step identifier identifying a step to be executed in the future and a step description associated with the step. In this manner, both the step identifier and the step description may be provided for use by a user interface mechanism. More particularly, a "define" step such as that described above may be provided for multiple steps in the process to be performed. The job then provides a begin indicator at block 504 indicating that execution of a step identified by the step identifier is beginning. A progress indicator indicating the progress of one of the steps in the executing process is then provided at block 506. More particularly, as described above, a step identifier is preferably provided to identify the step being executed. In addition, the progress indicator may be implemented in a variety of ways. For instance, the progress indicator may include one or more values indicating a percentage completion of the step. Progress reporting continues as the step in the process executes until it is determined at block 507 that the step is complete. A progress completion indicator indicating that execution of the step identified by the step identifier has completed is then provided at block 508. This process repeats as shown for each step in the process that is executed as shown at block 510.

Figure 6:
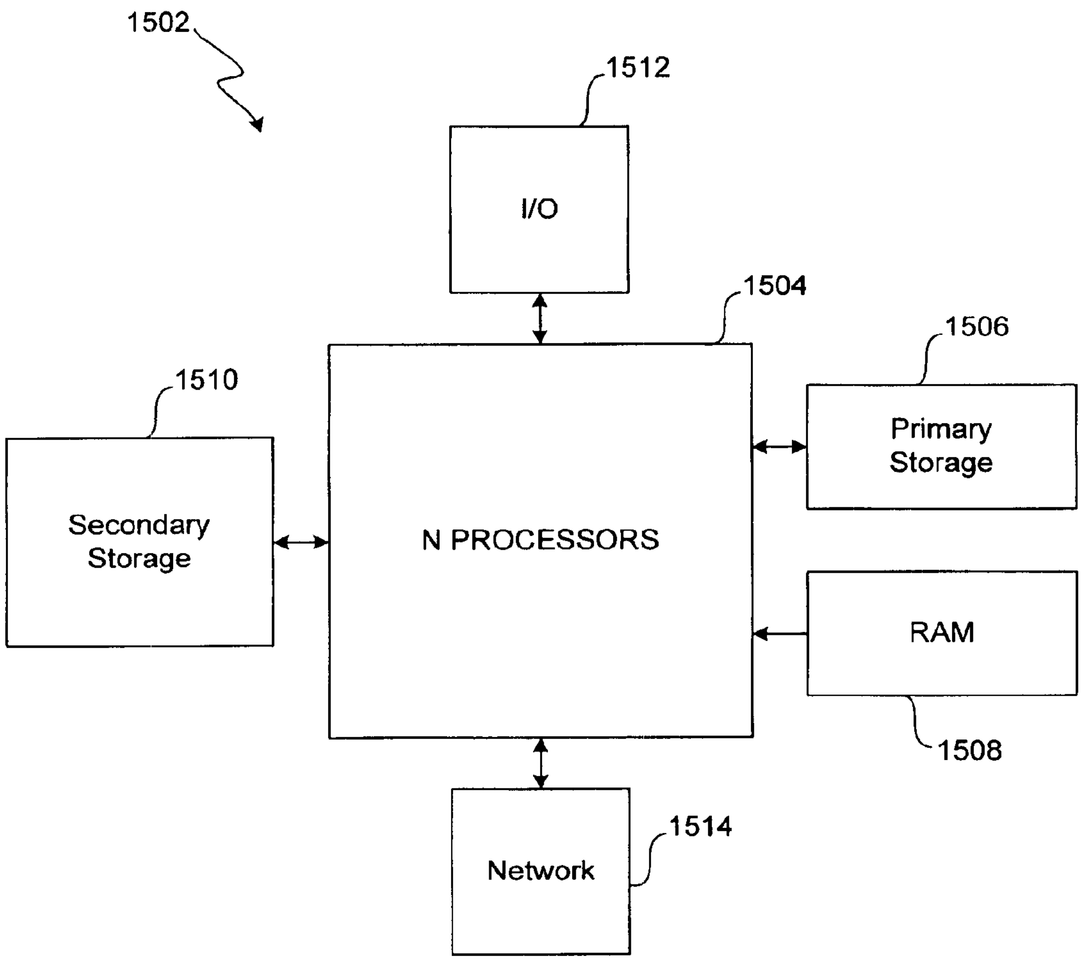
FIG. 6 is a block diagram illustrating a typical, general-purpose computer system suitable for implementing the present invention.

The present invention may be implemented on any suitable computer system. FIG. 6 illustrates a typical, general-purpose computer system 1502 suitable for implementing the present invention. The computer system may take any suitable form. For example, the computer system may be integrated with a digital television receiver or set top box. Thus, such a computer system may be used to execute a process or implement a user interface mechanism in accordance with above-described embodiments of the invention.

Computer system 1530 or, more specifically, CPUs 1532, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. Moreover, the above-described process blocks are illustrative only. Therefore, the implementation of the progress reporting interface using a progress reporting language may be performed using alternate process blocks as well as alternate command line structures. In addition, in order to implement a system capable of parallel processing, a process identifier may be provided in addition to a step identifier. For example, the define, begin, end, and progress steps illustrated above may further include a process or job identifier. Accordingly, the present embodiments are to be considered as illustrative and not restrictive, and the invention is not to be limited to the details given herein, but may be modified within the scope and equivalents of the appended claims.

What is claimed is:

1. A computer implemented method of reporting a progress of an executing process in a computer, comprising:

while the process is executing, generating a progress record in a progress reporting language, the progress record indicating a progress of one or more steps in the executing process, wherein the generated progress record is self-defining of the progress of the executing process, without reference to a characterization of the process outside the progress record; and providing the progress record to a user interface mechanism capable of interpreting the progress reporting language in which the progress record has been generated, the user interface mechanism adapted for generating the progress report in a user interface indicating the progress of the one or more steps in the executing process.

2. The method as recited in claim 1, wherein generating a progress record in a process reporting language comprises generating a step identifier in the progress record identifying a step in the process and a step description associated with the step identifier, the step description being adapted for display by the user interface mechanism.

3. The method as recited in claim 2, wherein the step is to be performed in the future.

4. The method as recited in claim 2, wherein generating a progress record in a progress reporting language further comprises:

generating a begin indicator in the progress record indicating that execution of a step in the process identified by the step identifier is beginning.

5. The method as recited in claim 2, wherein generating a progress record in a progress reporting language further comprises:

generating a progress indicator in the progress record associated with the step identifier indicating the progress of a step identified by the step identifier.

6. The method as recited in claim 2, wherein generating a progress record in a progress reporting language comprises:

providing a completion indicator in the progress record indicating that execution of the step identified by the step identifier has completed.

7. The method as recited in claim 1, wherein generating a progress record in a progress reporting language comprises:

generating a progress indicator in the progress record indicating the progress of one of the steps in the executing process.

8. The method as recited in claim 7, wherein the progress indicator indicates a percentage of completion of the step of the executing process.

9. The method as recited in claim 7, wherein the progress indicator comprises one or more values indicating the progress of the step of the executing process.

10. A computer-implemented method of providing a progress report associated with an executing process in a computer, comprising:

while the process is executing, receiving a progress record in a progress reporting language, the progress record indicating in the progress reporting language a progress of one or more steps in the executing process, wherein the progress record is self-defining of the progress of the process, without reference to a characterization of the executing process outside the progress record;

ascertaining the progress of the steps in the executing process from the progress record; and generating the progress report in a user interface indicating the progress of the steps in the executing process.

11. The method as recited in claim 10, wherein the progress record comprises a step identifier identifying a step in the process and a step description associated with the step identifier, the step description being adapted for display by the user interface mechanism.

12. The method as recited in claim 11, wherein the step is to be performed in the future.

13. The method as recited in claim 11, wherein the progress record comprises a begin indicator indicating that execution of a step in the process identified by the step identifier is beginning.

14. The method as recited in claim 11, wherein the progress record comprises a progress indicator associated with the step identifier indicating the progress of a step identified by the step identifier.

15. The method as recited in claim 11, wherein the progress record further comprises a completion indicator indicating that execution of the step identified by the step identifier has completed.

16. The method as recited in claim 10, wherein the progress record comprises a progress indicator indicating the progress of one of the steps in the executing process.

17. The method as recited in claim 16, wherein the progress indicator indicates a percentage of completion of the step of the executing progress.

18. The method as recited in claim 16, wherein the progress indicator comprises one or more values indicating the progress of the step of the executing process.

19. A computer-readable medium storing thereon instructions for a computer to report a progress of an executing process in the computer, comprising:

instructions for the computer to generate a progress record in a progress reporting language, the progress record indicating a progress of one or more steps in the executing process, wherein the generated progress record is self-defining of the progress of the executing process, without reference to a characterization of the process outside the progress record; and instructions for providing the progress record to a user interface mechanism capable of interpreting the progress reporting language in which the progress record has been generated, the user interface mechanism adapted for generating the progress report in a user interface indicating the progress of the one or more steps in the executing process.

20. A computer system for reporting a progress of an executing process, comprising:

means for, while the process is executing, generating a progress record in a progress reporting language, the progress record indicating a progress of one or more steps in the executing process, wherein the generated progress record is self-defining of the progress of the executing process, without reference to a characterization of the process outside the progress record; and means for providing the progress record to a user interface mechanism capable of interpreting the progress reporting language in which the progress record has been generated, the user interface mechanism adapted for generating the progress report in a user interface indicating the progress of the one or more steps in the executing process.

21. An apparatus for reporting a progress of an executing process, comprising:

a processor; and a memory, at least one of the processor and the memory being adapted for: generating a progress record in a progress reporting language, the progress record indicating a progress of one or more steps in the executing process, wherein the generated progress record is self-defining of a progress report of the process, without reference to a characterization of the process outside the progress record; and providing the progress report to a user interface mechanism capable of interpreting the progress reporting language, the user interface mechanism adapted for generating a user interface indicating the progress of the one or more steps in the executing process.

22. A computer-readable medium storing thereon instructions for a computer to provide a progress associated with an executing process, comprising:

instructions for, while the process is executing, receiving a progress record in a progress reporting language, the progress record indicating in the progress reporting language a progress of one or more steps in the executing process; wherein the progress record is self-defining of the progress of the process, without reference to a characterization of the executing process outside the progress record, instructions for ascertaining the progress of the steps in the executing process from the progress report; and instructions for generating the progress report in a user interface indicating the progress of the steps in the executing process.

23. A computer system for providing a progress report associated with an executing process in the computer system, comprising:

means for, while the process is executing, receiving a progress record in a progress reporting language, the progress record indicating in the progress reporting language a progress of one or more steps in the executing process, wherein the progress record is self-defining of the progress of the process, without reference to a characterization of the executing process outside the progress record;

means for ascertaining the progress of the steps in the executing process from the progress record; and means for generating the progress report in a user interface indicating the progress of the steps in the executing process.

24. An apparatus for providing a progress report associated with an executing process, comprising:

a processor; and a memory, at least one of the processor and the memory being adapted for:

receiving a progress record in a progress reporting language, the progress record indicating in the progress reporting language a progress of one or more steps in the executing process, wherein the progress record is self-defining of the progress of the process, without reference to a characterization of the executing process outside the progress record;

ascertaining the progress of the steps in the executing process from the progress record; and generating the progress report in a user interface indicating the progress of the steps in the executing process.

* * * * *